United States Patent
Breuls et al.

(10) Patent No.: US 6,718,801 B1
(45) Date of Patent: Apr. 13, 2004

(54) MCVD/PCVD METHOD FOR MAKING A PREFORM WITH MOVEMENT OF A FURNACE

(75) Inventors: Antonius Henricus Elisabeth Breuls, Urmond (NL); Dennis Robert Simons, Eindhoven (NL); Henrikus Lambertus Maria Jansen, Bergeijk (NL)

(73) Assignee: Plasma Optical Fibre B.V., Eindhoven (NL)

(*) Notice: Subject to any disclaimer, the term of this patent is extended or adjusted under 35 U.S.C. 154(b) by 227 days.

(21) Appl. No.: 09/615,662

(22) Filed: Jul. 14, 2000

(30) Foreign Application Priority Data

Jul. 16, 1999 (NL) .............................................. 1012616

(51) Int. Cl.[7] .......................................... C03B 37/018
(52) U.S. Cl. .............................. 65/391; 65/419; 65/424
(58) Field of Search ........................... 65/419, 391, 424

(56) References Cited

U.S. PATENT DOCUMENTS

| | | | |
|---|---|---|---|
| 4,009,014 A | 2/1977 | Black et al. ................ 65/3 |
| 4,125,389 A | * 11/1978 | King ......................... 219/693 |
| 5,318,612 A | * 6/1994 | Le Noane et al. .......... 65/30.1 |
| 5,397,372 A | 3/1995 | Partus et al. ................. 65/391 |

FOREIGN PATENT DOCUMENTS

| | | |
|---|---|---|
| DE | 25 33 040 | 2/1977 |
| DE | 26 38 830 | 3/1978 |
| DE | 37 31 346 A1 | 3/1989 |
| DE | 40 01 462 A1 | 7/1991 |
| EP | 0140113 | 5/1985 |
| EP | 0 171 103 A1 | 2/1986 |
| EP | 0 140 113 B1 | 6/1987 |
| JP | 56-50131 | 5/1981 |
| JP | 58-69737 | 4/1983 |

* cited by examiner

Primary Examiner—John Hoffmann
(74) Attorney, Agent, or Firm—Seed IP Law Group PLLC

(57) ABSTRACT

The present invention relates to a method for producing a preform, which is substantially free of OH impurities, for an optical fiber, wherein one or more quartz layers, which may or may not be doped, are deposited on the internal surface of a quartz glass support tube, in which method a furnace is moved axially with respect to the support tube, and after the quartz layers have been deposited the support tube is contracted into a bar-shaped preform while being heated, wherein the furnace comprises an electrical resistance furnace, in which furnace the support tube is rotated, with the space between the rotating support tube and the furnace being washed with an inert gas.

1 Claim, 2 Drawing Sheets

MCVD/PCVD METHOD FOR MAKING A PREFORM WITH MOVEMENT OF A FURNACE

BACKGROUND OF THE INVENTION

1. Field of the Invention

The present invention relates to a method for producing a preform, which is substantially free of OH impurities, for an optical fibre, wherein one or more quartz layers, which may or may not be doped, are deposited on the internal surface of a quartz glass support tube, in which method a furnace is moved axially with respect to the support tube, and after the quartz layers have been deposited the support tube is contracted into a bar-shaped preform while being heated. The present invention furthermore relates to a fibre obtained from such a preform.

2. Description of the Related Art

The method as referred to in the introduction is known from German Offenlegungsschrift No. 37 31 346. According to the method disclosed therein, a quartz glass support tube is internally coated according to the so-called MCVD method (Modified Chemical Vapour Deposition) with one or more doped and/or undoped glassy quartz layers which correspond to the core and/or the cladding of the quartz optical light waveguide to be formed. Said internal coating takes place in such a manner that a glass-forming mixture, $SiCl_4$, for example, and also $O_2$, is introduced into said support tube on one side thereof and so heated therein, for example to a temperature of 1600° C., that the desired glass layer is deposited on the internal surface. The heat source required for that purpose is for example a flame which is moved axially with respect to the support tube. Furthermore it is known from said German Offenlegungsschrift not to rotate the quartz glass support tube. This method of non-rotation is in particular applied here because the rotary seals which are consequently required are not needed upon introduction of the glass-forming gases, since such rotary seals would have the drawback of a disruptive water vapour, for example formed from the humidity in the air, finding its way into the support tube in an uncontrollable manner in case of inadequate seals.

The burning process and the high temperatures may thus lead to the inclusion of the undesirable OH groups in the external surface of the support tube. Since the support tube forms part of the fibre yet to be drawn, it is to be expected that said included OH groups will present problems as regards the optical properties of the glass fibre that is eventually obtained. The OH groups that are included on the outer side can diffuse inwardly, that is, in the direction of the core, in the course of the further processing steps, when temperatures are high. It has become apparent that said OH groups produce adverse effects in the light-conducting part of the optical fibre. After all, the OH groups exhibit a wide absorption peak at 1385 nm. As a result, additional signal loss occurs in the optical glass fibre with the transmission wavelengths around 1300 nm and 1500 nm that are currently being used. Moreover, said absorption peak at 1385 nm limits the use of the fibre over a large wavelength range that recent developments require. Another drawback of the included OH groups on the external surface of the support tube is the fact that they limit the reduction of the portion of CVD (chemical vapour deposition) glass in the optical fibre.

Thus it is desirable that the effect of the inwardly diffusing OH groups is minimized, thus minimizing the signal loss at the standard transmission wavelengths, which makes the fibre very suitable from a commercial point of view.

Moreover, the prior art heat sources, viz. the use of the flame technique, exhibit an additional drawback in that expensive combustion gases are used, with a relatively great deal of energy being lost. In addition, a rather considerable amount of glass is lost as a result of vaporizing in the flame, and the contraction speed is limited.

Another method for making a preform which is substantially free of OH impurities is known from U.S. Pat. No. 5,397,372. According to the method disclosed therein, a vapour mixture including at least one compound glass-forming precursor is introduced into a (possibly rotating) support tube together with an oxidizing medium, generating a hydrogen-free isothermal plasma on an outer surface of the tube as the heat source, as a result of which the glass-forming mixture will react and a glassy deposit will be produced on the inner surface of the tube, thereby forming a glass preform.

A similar method is known from European patent application No. 0 171 103, wherein a plasma furnace is moved round a rotating support tube along the axial length thereof so as to produce a preform. No mention is made of the presence of harmful OH impurities.

German Offenlegungsschrift No. 40 01 462 discloses a method for producing a preform wherein one or more layers of glass are deposited on the internal surface of a vertically clamped-down support tube. The heat source that is used is a graphite resistance furnace, which is moved axially over the non-rotating support tube. No mention is made of the presence of harmful OH impurities.

The method of moving a furnace axially with respect to the support tube, wherein the support tube rotates in the furnace, is known per se from U.S. Pat. No. 5,090,978, wherein a torch assembly is used as the heat source. No mention is made of the presence of harmful OH impurities.

U.S. Pat. No. 4,009,014 discloses a method for collapsing a layered support tube into a bar-shaped preform by using heat, which method uses an oxyhydrogen flame as the heat source.

European patent application No. 0 140 113 discloses a method for manufacturing optical fibre preform wherein the support tube is heated while being rotated, using a stationary heat source of length equal to the support tube. Such a heat source is controlled in such a manner that a temperature profile is applied both over the radius and along the length of the support tube in order to thus enhance productivity and reproducibility; no mention whatever is made as regards preventing the harmful presence of OH impurities.

BRIEF SUMMARY OF THE INVENTION

Accordingly, it is an object of the present invention to provide a method for producing a preform which is substantially free of OH impurities, which method eliminates the drawbacks of the prior art.

It is another object of the present invention to produce a preform containing a low amount of OH impurities by using a quick and inexpensive process.

DETAILED DESCRIPTION OF THE INVENTION

Figure 1:
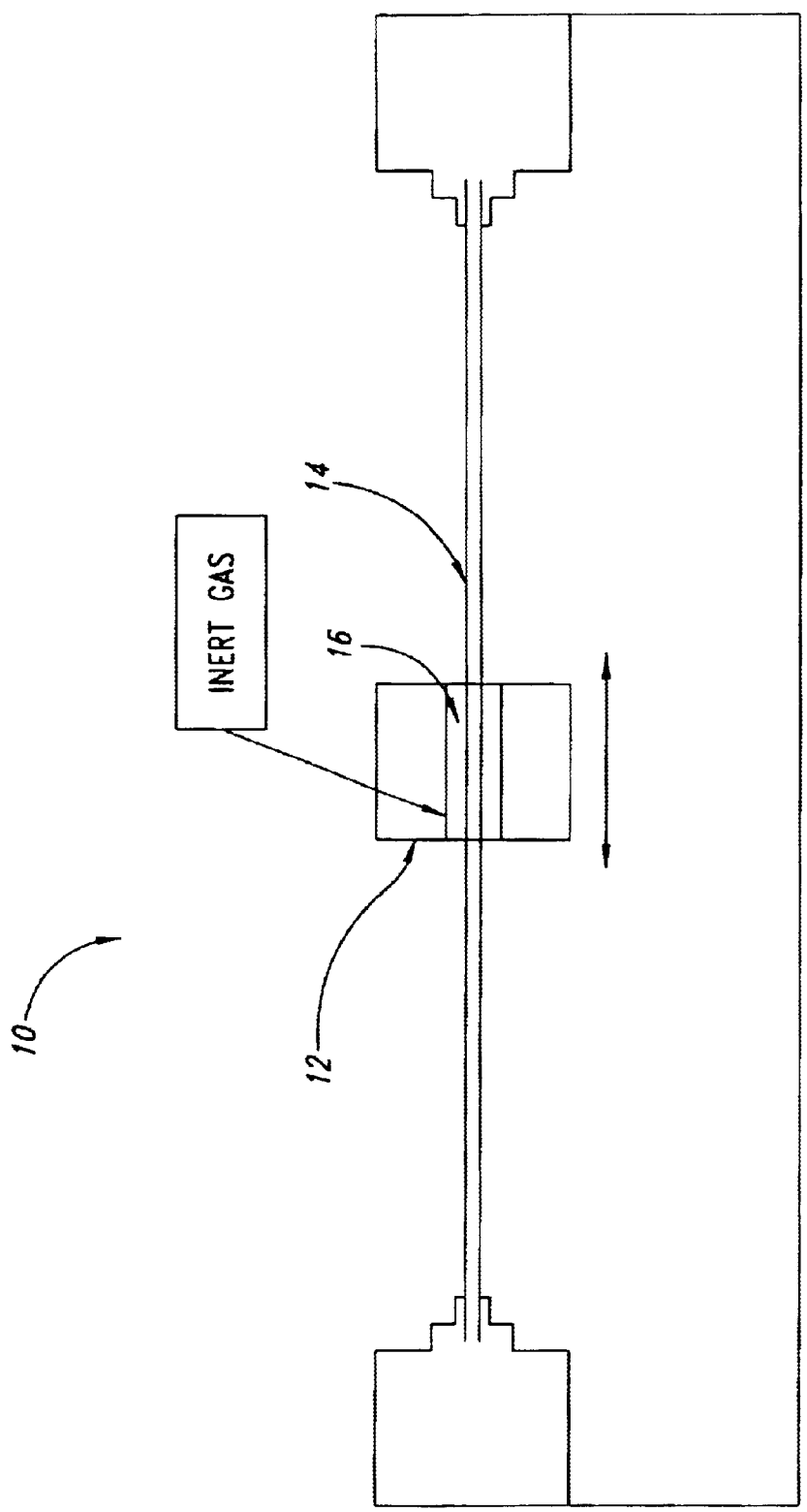
FIG. 1 is a side view representation of an electrical resistance furnace formed in accordance with the present invention.

According to the present invention, the method as referred to in the introduction is characterised, as shown in FIG. 1, in that said furnace 10 comprises an electrical resistance furnace 12, in which furnace the support tube is rotated 14, with the space 16 between the rotating support tube 14 and the furnace 12 being washed with an inert gas.

Although the use of an electrical furnace under rotation of the support tube for producing a preform is known per se from German Offenlegungsschrift No. 25 33 040, it is not known from said publication to move the furnace axially with respect to the support tube. Moreover, no mention is made therein as regards the production of a preform containing a low amount of OH impurities.

In a special embodiment of the present invention it is furthermore preferable that the temperature of the electrical resistance furnace be set so that the contracting of the support tube takes place within the processing range of the glass composition in question, in particular at a temperature below the melting temperature and above the softening temperature of the support tube. The softening temperature is characterised by a viscosity of $10^{6.65}$ Pa.s, the melting temperature is characterised by a viscosity of $10^1$ Pa.s. The combination of furnace temperature and axial velocity of movement of the electrical resistance furnace relative to the support tube provides the desired temperature at which contraction takes place.

In order to prevent OH groups being included at the external surface of the support tube, the contraction of the support tube is preferably carried out in a dry atmosphere, that is, an atmosphere wherein the humidity level is low. After all, the water vapour which is present in the atmosphere will be absorbed on the support tube, which is still hot, when the humidity level is relatively high, as a result of which OH groups will burn in, which is undesirable in practice.

If the viscosity of the material of the support tube lies outside the aforesaid range, the contraction of the support tube will be insufficient at the prevailing temperature in the furnace.

It is furthermore preferable that the electrical resistance furnace effects rotation-symmetrical heating of support tube. Said rotation-symmetrical heating of the support tube is in particular required in order to prevent axial and radial stresses occurring in the support tube.

The axial length along which the heating of the support tube by means of the electrical resistance furnace takes place preferably ranges between 5 cm and 20 cm, preferably between 7 cm and 15 cm.

When the zone of the support tube that is to be heated lies beyond the upper limit of the aforesaid range, the length of the tube which is effectively contracted will be too small. When the hot zone in the electrical resistance furnace is <5 cm, however, the production speed will decrease undesirably.

In a special embodiment of the present invention it is furthermore preferable that the contracting of the support tube is carried out while continuously washing the support tube internally with a gas, preferably an oxygen-containing gas.

Washing with an oxygen-containing gas during contracting is in particular preferable with a view to preventing vaporisation of glass-forming oxides in the innermost one of the deposited layers on the support tube. Such vaporisation may cause a disruption of the refractive index, whereby furthermore the deposition of impurities on the inside of the support tube is prevented.

In a special embodiment of the method according to the present invention it is preferable to have the rotation of the support tube take place at a rotational speed of more than 5 revolutions per minute, in particular 15–35 revolutions per minute.

When the number of revolutions is lower than the aforesaid lower limit, the tube will sag during rotation and possibly start to oscillate. In addition, the support tube will not be heated uniformly.

According to the present invention it is furthermore preferable that the inert gas that is used for washing the space between the rotating support tube and the electrical resistance furnace is essentially a gas selected from a group consisting of argon, helium and nitrogen, or a mixture thereof.

Washing the space between the rotating support tube and the electrical resistance furnace with an inert gas is in particular required with a view to extending the life of the electrical resistance furnace. After all, it is a well-known fact that the prevailing high temperature may cause the lining material of the furnace to be incinerated, which incineration is according to the present invention prevented by washing the annular space between the rotating support tube and the furnace with an inert gas. In addition to that, the formation of silicon carbides on the support tube surface is prevented in this manner. The formation of silicon carbides is in particular undesirable because they adversely affect the strength of the glass fibre that is to be produced eventually.

It is furthermore preferable to carry out the deposition of the quartz layers on the internal surface of the support tube by using a Plasma Chemical Vapour Deposition (PCVD) process.

The present invention furthermore relates to a fibre obtained by drawing a fibre, using heat, from a preform produced in accordance with the above-described method. The aforesaid method is not limited to the production of fibres or preforms having a standard refractive index profile. It should be understood that according to the present invention any combination of profiles and/or materials can be used.

The present invention will now be explained in more detail by means of examples. It should be understood, however, that the present invention is not limited to such examples, but that the examples merely function to illustrate the present invention.

EXAMPLE 1

A quartz glass support tube including a number of internal surface layers, in particular a quartz glass layer, deposited by means of a PCVD process was rotated at a speed of 25 revolutions per minute, with an electrical resistance furnace having a temperature of about 2200° C. being moved four times in axial direction over the rotating support tube during rotation. The speed of the furnace thereby amounted to 20–30 mm/min. The space between the furnace and the support tube was washed with argon during said contraction, the internal space of the support tube was washed with an oxygen-containing gas.

Measurements have shown that the burning loss of the preform produced in this manner, which burning loss is a measure for the durability of the support tube during contracting, had a value of 0.05 mg/m$_2$, whilst a preform produced with a conventional natural gas burner exhibited a substantially higher burning loss, viz. a value of 1.75 mg/M$_2$. Thus it is possible by using the method according to the present invention to obtain a higher fibre yield per preform.

EXAMPLE 2

Figure 2:
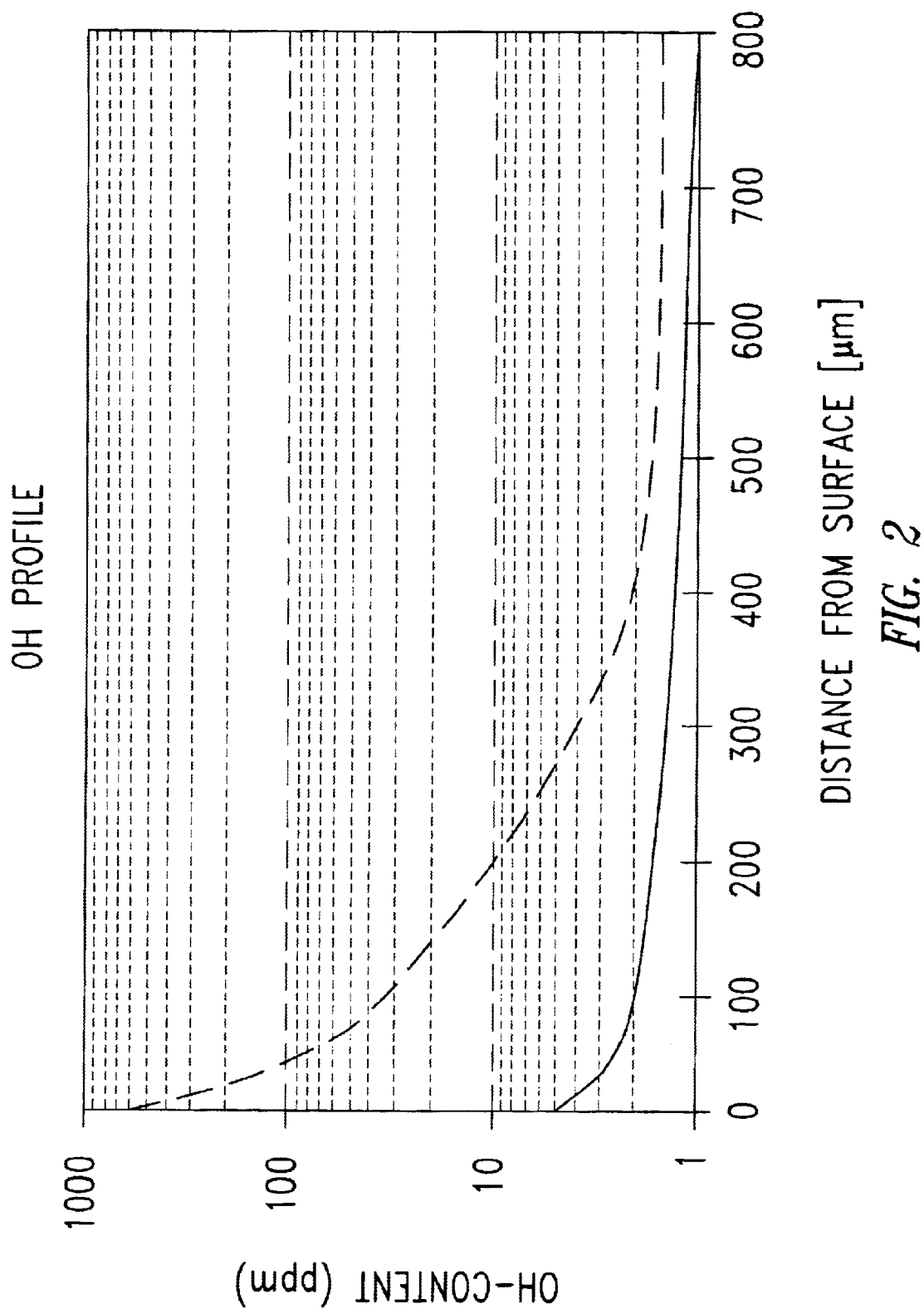
FIG. 2 is a graph of OH content as a function of distance to an external surface.

The same preparation as in example 1 was used for contracting a quartz glass support tube into a massive bar. In addition, a quartz glass supported tube was contracted into a massive bar by means of a conventional technique, using an $H_2/O_2$ burner. In order to measure the OH content of the two contracted supported tubes, one surface layer was removed step by step from the outer side of the support tube, using a chemical etching technique, after which the OH content as a function of the distance to the external surface was measured by means of an IR transmission technique. The results are schematically shown in appended FIG. 2. From the figure it is apparent that the OH content of the support tube according to the present invention contracted by means of an electrical resistance furnace is substantially lower than that of a support tube contracted into a massive bar by means of $H_2/O_2$. The low OH content of the present massive bar is ascribed to absorption of moisture from the surrounding atmosphere, which content can be reduced by carrying out the contraction in an atmosphere wherein the humidity level is low.

What is claimed is:

1. A method for producing a preform that is substantially free of OH impurities for an optical fibre, comprising: depositing one or more quartz layers that may or may not be doped on the internal surface of a quartz glass support tube by using a Plasma Chemical Vapor Deposition (PCVD) process, and in which method a furnace is moved axially with respect to the support tube; following deposition of the quartz layers, contracting the support tube into a bar-shaped preform while being heated, the furnace comprising an electrical resistance furnace in which the support tube is rotated, and where the space between the rotating support tube and the furnace is washed with an inert gas.

* * * * *